US008311993B2

(12) United States Patent
Kumar et al.

(10) Patent No.: US 8,311,993 B2
(45) Date of Patent: Nov. 13, 2012

(54) CONTROLLING AND RECOVERING LONG-LIVED TRANSACTIONS

(75) Inventors: Manoj N. Kumar, Austin, TX (US); Gunisha Madan, Austin, TX (US); Grover H. Neuman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 12/879,856

(22) Filed: Sep. 10, 2010

(65) Prior Publication Data
US 2012/0066189 A1 Mar. 15, 2012

(51) Int. Cl.
G06F 7/00 (2006.01)
G06F 17/00 (2006.01)
(52) U.S. Cl. ........................................ 707/690; 707/703
(58) Field of Classification Search .......... 707/600–831; 711/162; 714/15, 20
See application file for complete search history.

(56) References Cited

U.S. PATENT DOCUMENTS

| 6,275,863 | B1 | 8/2001 | Leff et al. |
|---|---|---|---|
| 6,918,053 | B1 | 7/2005 | Thatte et al. |
| 7,380,166 | B2 | 5/2008 | Thatte et al. |
| 2005/0261914 | A1 | 11/2005 | Brookins |
| 2007/0220059 | A1* | 9/2007 | Lu et al. ........................ 707/200 |

OTHER PUBLICATIONS

Salem et al., Altruistic locking, Mar. 1994, ACM, vol. 19, 117-165.*
Gopi Attaluri, Issues in managing long transactions and large objects in a multidatabase system, Nov. 1992, ACM, 129-151.*
Garcia-Molina, Hector et al., "Sagas", *ACM SIGMOD Record*vol. 16, Issue 3, ISSN:0163-5808, http://portal.acm.org/citation.cfm?id=38742 (Obtained from the Internet Jul. 7, 2010). Dec. 1987, pp. 249-259.
Mohan, C , "Tutorial: Advanced Transaction Models—Survey and Critique", *IBM Almaden Research Center*Presented at ACM SIGMOD International Conference on Management of Data Jun. 29, 1995 , 29 pages.

* cited by examiner

*Primary Examiner* — Jean B Fleurantin
(74) *Attorney, Agent, or Firm* — DeLizio Gilliam, PLLC

(57) ABSTRACT

Some embodiments of the inventive subject matter are directed to performing sub-transactions of a long-lived transaction (LLT) in a sequence (e.g., according to an LLT flow) and writing a log entry at the performance of each of the sub-transactions that specifies results of the sub-transaction. Some embodiments do not require generating any compensating transactions during performance of the sub-transactions. Some embodiments are further directed to detecting that an interruption occurs to the LLT and repeating, or initiating re-performance of the LLT from the beginning of the sequence following the flow of the LLT from its beginning. During the re-performance of the LLT, some embodiments are further directed to checking the log entry at each sub-transaction to determine whether the sub-transaction was performed successfully before the interruption. If the log indicates that the long-lived transaction completed successfully, some embodiments are further directed to skipping performance of the sub-transaction until reaching a sub-transaction that does not have a valid log entry, then returning an error and recovering the LLT using instructions for compensating transactions that are already written into the LLT flow.

24 Claims, 4 Drawing Sheets

CONTROLLING AND RECOVERING LONG-LIVED TRANSACTIONS

BACKGROUND

Embodiments of the inventive subject matter generally relate to the field of transaction management, and, more particularly, to management of long-lived transactions.

A long-lived transactions (LLT) is a transaction that, by design, consists of multiple database transactions, or sub-transactions, that must all be performed in a sequence (e.g., serially, in parallel, a combination, etc.). The sequence of sub-transactions that make up the LLT are grouped to achieve a single atomic result for the LLT. LLTs are sometimes referred to as "sagas." The sub-transactions are also called phase functions or phase transactions because they represent phases in the sequence for the LLT. Currently, some management systems control LLTs by generating a compensating transaction for each sub-transaction within the LLT and storing data for the compensating transactions in a database to be used at a later point when recovering the LLT. When there is a problem, then the code undoes each of the operations using the stored data. Generating compensating transactions can add to the overhead of the management system, which can make the LLT inefficient and time-consuming when performed for each of the operations. Currently, some management systems also separately track successful completion points in a flow of the LLT, after each successfully completed sub-transaction. When the LLT encounters a problem and needs to recover, the management system returns to the last successful completion point. Tracking successful completion points, however, can also add to the overhead of the management system which can be inefficient and time-consuming.

SUMMARY

Some embodiments include a method directed to initiating a long lived transaction that comprises a plurality of operations that each generate data when performed, wherein the plurality of operations are to be completed in a sequence for the long-lived transaction. In some embodiments, the method can further be directed to writing the data to a log file for each completed one of the plurality of operations. In some embodiments, the method can further be directed to detecting an interruption in performance of an uncompleted one of the plurality of operations. In some embodiments, the method can further be directed to restarting the long-lived transaction in response to detecting the interruption. In some embodiments, the method can further be directed to reading the data written in the log file for each completed one of the plurality of operations in order of the sequence. In some embodiments, the method can further be directed to determining that the log file indicates a successful completion of each completed one of the plurality of operations in response to the reading the data written in the log file for each completed one of the plurality of operations in order of the sequence. In some embodiments, the method can further be directed to initiating re-performance of the uncompleted one of the plurality of operations in the order of the sequence without re-performing the each completed one of the plurality of operations in response to determining that the log file indicates the successful completion of the each completed one of the plurality of operations.

Some embodiments include a computer program product for controlling a long-lived transaction. The computer program product can include a computer readable storage medium having computer readable program code embodied therewith. The computer readable program code can be configured to perform a first portion of a plurality of operations of the long-lived transaction, wherein the long-lived transaction begins with one of the first portion of the plurality of the operations, wherein the plurality of the operations are required to be completed in a sequence for the long-lived transaction, and wherein each of the plurality of the operations generates data. In some embodiments, the computer readable program code can further be configured to write individual log entries for the data to a log file as each of the first portion of the plurality of the operations is performed in the sequence. In some embodiments, the computer readable program code can further be configured to detect an interruption in the performance of an additional one of the plurality of operations that begins a second portion of the plurality of operations. In some embodiments, the computer readable program code can further be configured to initiate re-performance of the first portion of the plurality of the operations in the sequence starting with the one of the plurality of the operations in response to detecting the interruption. In some embodiments, the computer readable program code can further be configured to read the data written in each of the individual log entries in order of the sequence and determine that each of the individual log entries indicate a successful completion of each of the first portion of the plurality of the operations. In some embodiments, the computer readable program code can further be configured to skip performance of at least a part of each of the first portion of the plurality of operations in response to determining that each of the individual log entries indicate the successful completion of each of the first portion of the plurality of the operations.

Some embodiments are directed to an apparatus with a processing unit, a network interface, and a long-lived transaction controller. In some embodiments, the long-lived transaction controller is operable to, via the processing unit, perform a first portion of a plurality of operations of the long-lived transaction, wherein the long-lived transaction begins with one of the first portion of the plurality of the operations, wherein the plurality of the operations are required to be completed in a sequence for the long-lived transaction, wherein each of the plurality of the operations generates data, and not generating a compensating transaction for any of the plurality of operations. In some embodiments, the long-lived transaction controller is further operable to write individual log entries for the data to a log file as each of the first portion of the plurality. In some embodiments, the long-lived transaction controller is further operable to detect an interruption in the performance of an additional one of the plurality of operations that begins a second portion of the plurality of operations. In some embodiments, the long-lived transaction controller is further operable to initiate re-performance of the first portion of the plurality of the operations in the sequence starting with the one of the plurality of the operations in response to detecting the interruption. In some embodiments, the long-lived transaction controller is further operable to read the data written in each of the individual log entries in order of the sequence. In some embodiments, the long-lived transaction controller is further operable to determine that each of the individual log entries indicate a successful completion of each of the first portion of the plurality of the operations. In some embodiments, the long-lived transaction controller is further operable to skip performance of at least a part of each of the first portion of the plurality of operations in response to determining that each of the individual log entries indicate the successful completion of each of the first portion of the plurality of the operations.

Some embodiments include a computer program product for controlling a long-lived transaction. The computer program product can include a computer readable storage medium having computer readable program code embodied therewith. The computer readable program code can be configured to perform a first of a plurality of sub-transactions from the long-lived transaction, wherein the plurality of the sub-transactions are required to be completed in a sequence for the long-lived transaction. In some embodiments, the computer readable program code can further be configured to determine that the first of the plurality of the sub-transactions requires a write of a data value to a database. In some embodiments, the computer readable program code can further be configured to write in a log an entry that indicates the data value. In some embodiments, the computer readable program code can further be configured to detect an interruption in the performance of the write of the data value to the database. In some embodiments, the computer readable program code can further be configured to initiate re-performance of the first of the plurality of the sub-transactions in order of the sequence. In some embodiments, the computer readable program code can further be configured to detect the data value in the entry of the log. In some embodiments, the computer readable program code can further be configured to use the data value indicated in the entry of the log to write the data value to the database.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to serial transactions, other instances may include parallel transactions, combinations of serial and parallel transactions, etc. In another example, although some examples may refer to distributed transactions, similar embodiments may also apply to non-distributed transactions, or vice versa. In other instances, well-known instruction instances, protocols, structures, and techniques have not been shown in detail in order not to obfuscate the description.

Figure 1:
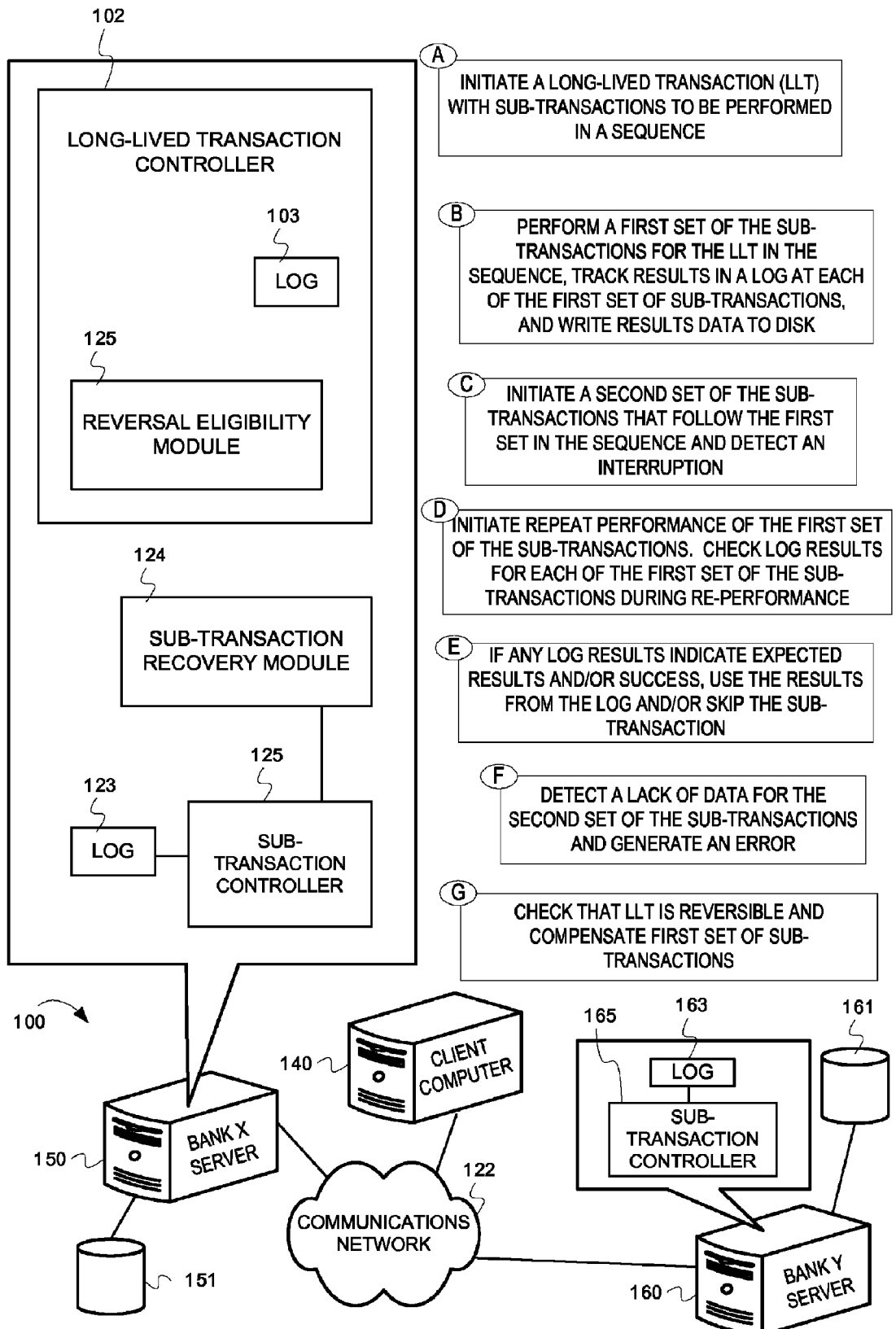
FIG. 1 is an example conceptual diagram of tracking results in a log of each sub-transaction of a long-lived transaction (LLT), recovering the long-lived transaction by repeating the LLT, and checking the log(s) at repetition of each sub-transaction for results.
Figure 2:
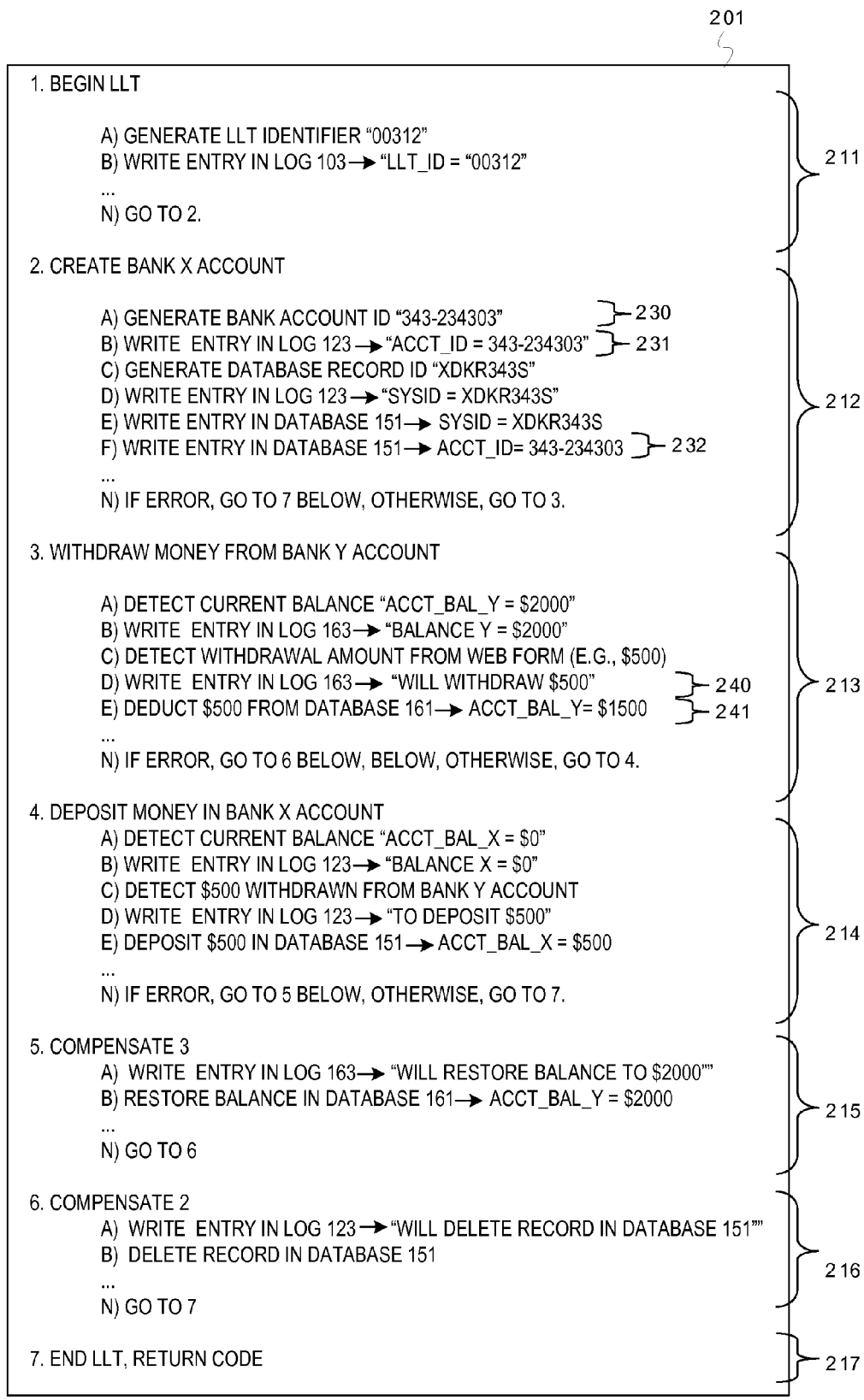
FIG. 2 is a block diagram depicting an example LLT 201 according to some embodiments.

FIG. 1 is an example conceptual diagram of tracking results in a log of each sub-transaction of a long-lived transaction (LLT), recovering the long-lived transaction by repeating the LLT, and checking the log(s) at repetition of each sub-transaction for results. In FIG. 1, a data management system ("system") 100 includes one or more devices, such as computers 140, 150 and 160, that are connected to each other by a communications network 122. The computers 140, 150, and 160 may all participate in portions of the LLT. For example, computer 140 may be a client computer and servers 150 and 160 may be server computers. The computer 140 (i.e., "client computer" 140) may request, via the Internet to open a banking account at a first bank ("Bank X") and transfer funds from a second bank ("Bank Y") to Bank X. The operations involved in opening the Bank X account and transferring funds from Bank Y are operations that can affect bank account balances, and therefore should be handled correctly. The operations, thus, are part of an LLT, which includes multiple parts, or sub-transactions, that follow a sequence. The sub-transactions must be completed successfully in their entirety, according to the sequence, or else all must fail and be recovered. Because the sub-transactions follow a specific sequence, the LLT may also be referred to herein as an LLT "flow." The sub-transactions break up the LLT into smaller transactions. Each of the sub-transactions can comprise one or more operations. The LLT requires completion of all sub-transactions and, consequently, completion of all constituent operations of the sub-transactions (e.g., the system 100 must successfully complete all sub-transactions of the LLT for the entire LLT flow to be valid and successful). FIG. 2 illustrates an example of an LLT 201 according to some embodiments. In FIG. 2, the LLT 201 includes a sequence of sub-transactions including first sub-transaction 211, second sub-transaction 212, third sub-transaction 213, fourth sub-transaction 214, fifth sub-transaction 215, sixth sub-transaction 216, and seventh sub-transaction 217 ("sub-transactions 211-217"). Some sub-transactions (i.e., sub-transactions 215 and 216) are compensating sub-transactions that, in the case of an error, restore data that was previously changed in other sub-transactions (i.e., sub-transactions 213 and 212 respectively). The seventh sub-transaction 217 returns final results of the LLT 201 to the operator that began the LLT 201 (e.g., returns information to the Internet user, via the computer 140, that the funds transferred properly or that an error occurred). The sequence that the sub-transactions 211-217 follow in the LLT 201 may be referred to herein as the "flow" of the LLT 201, or the LLT flow. FIG. 2 will be referred to in concert with the continued description of FIG. 1.

Returning to FIG. 1, the computer 140 may provide input that indicates the initiation of the LLT 201 (e.g., a user enters a user name, a password, a withdrawal amount, etc., and presses a "Submit" button on a web form, which causes the flow of the LLT 201 to initiate and perform the sub-transactions 211-217 via the computer 150 and the computer 160). The computer 150 may be referred to as "Bank X" server 150 and computer 160 may be referred to as "Bank Y" server 160. The Bank X server 150 and the Bank Y server 160 perform separate parts of the LLT 201 (e.g., Bank X server 150 controls the second sub-transaction 212 and the fourth sub-transaction 231 whereas Bank Y server 160 controls the third sub-transaction 213). The Bank X server 150 and the Bank Y server 160 may be referred to herein as nodes. In some embodiments, the communications network 122 may be the Internet. In some embodiments, the communications network 122 may be a private or public network(s), or a combination of private and public network(s). The timing of the sub-transactions 211-217 of the LLT 201 may occur over any period of time, within designed parameters of the LLT 201, for example, ranging from fractions of seconds to days, etc. The Bank X server 150 may include a long-lived transaction controller 102 according to some embodiments. The long-lived transaction controller 102 may access a log 103, a sub-transaction recovery module 124, and a reversal eligibility module 125. The long-lived transaction controller 102 is responsible for driving the LLT 201 according to the sequence, and tracking the state of the LLT 201 (e.g., responsible for initiating the sequence of the LLT 201, responsible for communicating data between nodes as necessary so that nodes can perform sub-transactions, responsible for marking the LLT 201 as a point-of-no-return (described further below), and responsible for terminating the LLT 201). The long-lived transaction controller 102 can make log entries in the log 103 regarding the state of the LLT 201. Each node can have a sub-transaction controller with its own log (e.g., Bank X server 150 includes a sub-transaction controller 125 with a log 123, whereas Bank Y server 160 includes a sub-transaction controller 165 with a log 163). The sub-transaction controllers 125 and 165 are responsible for performing the operations for their assigned sub-transactions and for logging data results for their own sub-transactions (e.g., sub-transaction controller 125 makes log entries into, and reads from, its own log 123 whereas sub-transaction controller 165 makes log entries into, and reads from, its own log 163). The sub-transaction controllers 125 and 165 are also responsible, during repeat performances of the LLT 201 (described further below) for checking their own logs for previous completions or non-completions of operations within their own sub-transactions, for reporting to the long-lived transaction controller 102 whether sub-transactions are completed, and for passing some data to the long-lived transaction controller 102 so that the long-lived transaction controller 201 can pass the data between nodes.

The Bank X server 150 and Bank Y server 160 can each include one or more data stores (e.g., database 151 and database 161) that store information for a first bank account at Bank X and a second bank account at Bank Y bank for a patron (e.g., user or entity) of Bank X and Bank Y. The patron can use the computer 140 to connect to one or more of the Bank X server 150 and Bank Y server 160, such as via the Internet (e.g., using browser software). The patron can use the computer 140 to control funds, settings, etc. in, or for, the first and second bank accounts (e.g., via online banking sessions).

In some embodiments, similar elements described in connection with Bank X server 150, such as the long-lived transaction controller 102, can also be included in Bank Y server 160 and/or in the client 140 in full or in part. In FIG. 1, however, the long-lived transaction controller 102 resides on the Bank X server 150 and drives the performance of the LLT 201. In other words, the long-lived transaction controller 102 initiates the performance of all sub-transactions 211-217 according to the code written in the LLT 201 even though either the Bank X server 150 or the Bank Y server 160 may perform the operations for the sub-transactions 211-217. In other words, the long-lived transaction controller 102 runs or drives the LLT 201, and may invoke subroutines associated with each of the sub-transactions 211-217. However, the long-lived transaction controller 102 may invoke code for the sub-routines on the Bank X server 150 or the Bank Y server 160 or may cause processors on the Bank X server 150 or the Bank Y server 160 to perform the operations. Thus, it should be understood that if the description herein indicates that the long-lived transaction controller 102 performs sub-transactions and/or operations that constitute a sub-transaction, the long-lived transaction controller 102 may initiate the performance of a sub-transaction and utilize other elements of the system 100 to perform the operations of the sub-transaction. Further, in other embodiments, the long-lived transaction controller 102 may reside on other computers not shown (e.g., on a separate server). In FIG. 1, because the long-lived transaction controller 102 resides on the Bank X server 150, the Bank X server 150 may also perform other sub-transactions for the LLT 201 including the first sub-transaction 211, the sixth sub-transaction 216 and the seventh sub-transaction 217.

Each node can write data about specific results on the different logs 123 or 163, depending on the location where sub-transactions 211-217 are performed. More specifically, each node in a distributed LLT can have its own log. Thus, each node can ensure that the sub-transactions for the node are at least stored at the node where the operations of the sub-transactions were performed.

The long-lived transaction controller 102 initiates the LLT 201 at stage "A." The long-lived transaction controller 102 can initiate the first sub-transaction 211. The Bank X server 150 can perform the operations for the first sub-transaction 211 which generate an LLT identifier, generate identifiers for some sub-transactions, etc.

At stage "B," the system 100 performs a first set of the sub-transactions for the LLT 201 in the sequence for the LLT 201, tracks results in one or more logs at each of the first set of the sub-transactions, and writes results data to disk. For example, the first sub-transaction 211, the second sub-transaction 212, and the third sub-transaction 213 are a first set of sub-transactions for the LLT 201. The second sub-transaction 212 creates the first bank account via Bank X server 150, and the third sub-transaction 213 withdraws an amount of money from the second bank account via Bank Y server 160. Each of the sub-transactions 212 and 213, include multiple operations that need to be performed. For example, the second sub-transaction 212 includes multiple operations that create first database record(s) (e.g., create a new entry and record identifier in database 151 for the first bank account in which to store information for the bank account), check a credit history for the requesting user, receive user credentials such as passwords, generate and/or validate personal identifiers, etc. The third sub-transaction 213 also requires multiple operations that receive a request to withdraw the amount of money, convert the funds from one money format to another (e.g., Euros to dollars), generate a withdrawal receipt, subtract the amount of funds from second database record(s) in database 161 for Bank Y, send the withdrawal receipt to Bank X server 150, etc. Any or all of the operations that are performed for the sub-transactions 212 and 213, can generate data results For example, during the second sub-transaction 212, operations generate a bank account identifier (e.g., 343-324303), a user account name, a user password, a bank account balance, etc. During the third sub-transaction 213, operations generate a withdrawal amount, a withdrawal receipt identifier, communication messages, etc. For each operation of sub-transaction 212 that produces a data result, and is performed via the Bank X server 150, the sub-transaction controller 125 writes an indication of the result to the log 123. For instance, the sub-transaction 212 includes an operation 230 that generates the bank account identifier "343-324303." The sub-transaction controller 125 can perform an operation 231 that writes in the log 123 and entry "ACCT_ID='343-234303'." Specific data for the sub-transaction may need to be written to a disk, or some other form of data store, for long-term storage. For example, the bank account identifier "343-234303," would need to be written to a database record in the database 151 for the first bank account, as specified in operation 232. The sub-transaction controller 125 writes the log entry of operation 231 before, or simultaneously with, the operation 232 writes the data to disk. The sub-transaction controller 125, thus, ensures that the log 123 indicates that data was written. The sub-transaction controller 125 can also write an additional log entry, or modify the previous log entry, after the data gets written to disk to verify that the data was actually written to disk. Further, for each operation that produces a data result and is performed via the Bank Y server 160, the sub-transaction controller 165 writes the data results to the log 163. For example, in the third sub-transaction 213, a withdrawal amount needs to be subtracted from a database record from the database 161 for the second bank account. The sub-transaction controller 165 would perform the operation 240 that writes an entry to the log 163 specifying the amount to be withdrawn (e.g., "will withdraw $500"). An additional operation 241 would then withdraw, or deduct, the amount from the database 161 (e.g., "ACCT_BAL_Y=$1, 500"). After the second sub-transaction 212 and the third sub-transaction 213 are completed, the sequence of the LLT 201 requires performance of the fourth sub-transaction 214 which will attempt to deposit the withdrawal amount from the second bank account (for Bank Y) to the first bank account (for Bank X).

At stage "C," the system 100 can initiate a second set of the sub-transactions that follow the first set of sub-transactions in the sequence for the LLT 201 and detect an interruption in the performance of the second set of sub-transactions. For example, the long-lived transaction controller 102 may initiate the fourth sub-transaction 214, which the sub-transaction controller 125 will perform. The fourth sub-transaction 214 is part of a second set of the sub-transactions (i.e., the second set includes the sub-transactions 214-217, that follow the first set of sub-transactions 211-213). The fourth sub-transaction 214 also includes multiple operations that attempt to deposit the amount of money withdrawn during the third sub-transaction 213. However, during the fourth sub-transaction 214, for example, the system 100 may experience an unintended interruption (e.g., network disconnect, data loss, power failure, code/script failure, etc.). The long-lived transaction controller 102 can detect the interruption and, at stage "D" initiate a "recovery pass," or second/repeat performance of the first set of the sub-transactions that follows exactly the same sequence of the LLT 201 that was run previously, before the interruption. The second or repeat performance of the LLT 201 includes additional operations that the sub-transaction controllers 125 and 165 will perform during their repeat performances of the sub-transactions to look up in the logs 123 and 163 whether their individual sub-transactions were previously performed successfully. For instance, the long-lived transaction controller 102 can return to the beginning of the LLT 201 (e.g., return to the first sub-transaction 211) and cause the LLT 201 follow the sequence of the LLT 201 from its beginning invoking all of the sub-transactions 211, 212, and 213 in the order of the sequence. However, when the sub-transactions 211 and 212 are re-invoked the sub-transaction controller 125 checks the log 123 before re-performing previously performed operations, to determine whether the operations of the sub-transactions 211 and 212 were previously completed. Further, when the sub-transaction 213 is re-invoked, the sub-transaction controller 165 checks the log 163 before re-performing previously performed operations. An operation does not have to be re-performed if the log 123 or log 163 indicates an expected or valid result for the operation (i.e., if the log 123 or log 163 includes an indication that a valid result occurred previously within the first performance of the LLT 201). For example, for the second sub-transaction 212, if the log 123 indicates a valid bank account identifier for the first bank account, the operations 230 and 231 do not need to be re-performed. Instead, at stage "E," the system 100 can reuse results and/or skip operations of a sub-transaction. For instance, the second sub-transaction 212 reuses the already existing bank account identifier for the first bank account from the log 123 and can provide the bank account identifier to the long-lived transaction controller 102 to provide to subsequent sub-transactions that may need the bank account identifier. The sub-transaction controllers 125 and 165 can also check the logs 123 and 163 to determine whether expected data results were written to disk. If so, then sub-transactions do not need to rewrite the data to the disk (e.g., the second sub-transaction 212 would not need to rewrite the bank account identifier to the database 151). In some operations, however, for sake of certainty or clarity, the sub-transaction controllers 125 and 165 can re-perform entire operations and re-write results to the logs (e.g., log 123 and/or the log 163), or the data stores (e.g., database 151 and/or database 161). The long-lived transaction controller 102 can, consequently, advance to the fourth sub-transaction 214 during the repeat performance of the LLT 201 without the sub-transactions 211-213 having to re-perform some or all of their operations that were successfully completed during the first performance of the LLT 201.

At stage "F," during the repeat performance of the second set of sub-transactions, the system 100 detects a lack of data, such as a lack of a log entry. For example, during repeat performance of the fourth sub-transaction 214, the sub-transaction controller 125 can determine that no log entry exists for some of the operations for the fourth sub-transaction 214 (e.g., the sub-transaction controller 125 determines that it failed to write log data regarding depositing the dollar amount via the Bank X server 150). The sub-transaction controller 125 can then generate an error message, at stage "G," to initiate a recovery procedure.

The recovery procedure performs a series of compensating sub-transactions 215 and 216 that recover one or more of the first set of the sub-transactions in reverse order (e.g., causes the sub-transaction recovery module 124 and/or the sub-transaction controllers 125 and 165 to recover the third sub-transaction 213 and the second sub-transaction 212). For instance, during the repeat performance of the LLT 201, the error occurs during the fourth sub-transaction 214 and the sequence of the LLT 201 continues at the fifth sub-transaction 215 which recovers the third sub-transaction 213 using data results stored in the log 163 to reverse any operations. Upon completing the fifth sub-transaction 215, the sequence of the LLT 201 continues at the sixth sub-transaction 215 which recovers the second sub-transaction 212 using the data stored in the log 123 to reverse any disk writes and restore data. The compensating sub-transactions 215 and 216 can be previously written into the programming of the LLT 201. The system 100 does not need to generate any new compensating transactions while performing the LLT 201.

When the system 100 encounters the error during the fourth sub-transaction 214, the system 100 (e.g., the sub-transaction controller 125) can write a log entry in the log 123 indicating that the error occurred. The system 100 does not need to perform a compensating transaction for the fourth sub-transaction 214 because if no entry was written in the log 123, then no data was written to disk and, thus, the fourth sub-transaction 214 does not need to be compensated. The system 100 can utilize the sub-transaction recovery module 124 and/or the sub-transaction controllers 125 and 165 to perform compensating transactions. Further, during the compensating transactions 215 and 216, the system 100 can write additional log entries in the log 123 and/or the log 163 that indicate that the compensating sub-transactions 215 and 216 were performed. If additional interruptions occur during the compensating sub-transactions 215 and/or 216, the long-lived transaction controller 102 can initiate additional repeat performances of the LLT 201 and the system 100 can refer to the log entries that indicate whether the compensating sub-transactions 215 and 216 were completed successfully.

Before performing any compensating sub-transactions, however, the system 100 can also determine whether the LLT is eligible to be reversed or compensated. The long-lived transaction controller 102, for instance, can determine when the transaction has reached a point-of-no-return, or an irreversibility point in the sequence of the LLT 201 at which point it would be impossible or impractical to reverse the LLT 201. The reversal eligibility module 125 can track irreversibility points. An example of an irreversibility point may be the completion of the withdrawal of funds during the third sub-transaction 213 if the third sub-transaction 213, for instance, zeroed out the second bank account and closed it during the third sub-transaction 213. The long-lived transaction controller 102 can mark the third sub-transaction 213 as an irreversibility point after the completion of the third sub-transaction 213. Thus, instead of performing the repeat performance of the LLT 201, the system 100 would instead perform the fourth sub-transaction 214 continuously until obtaining success and successfully completing the LLT 201.

Figure 3:
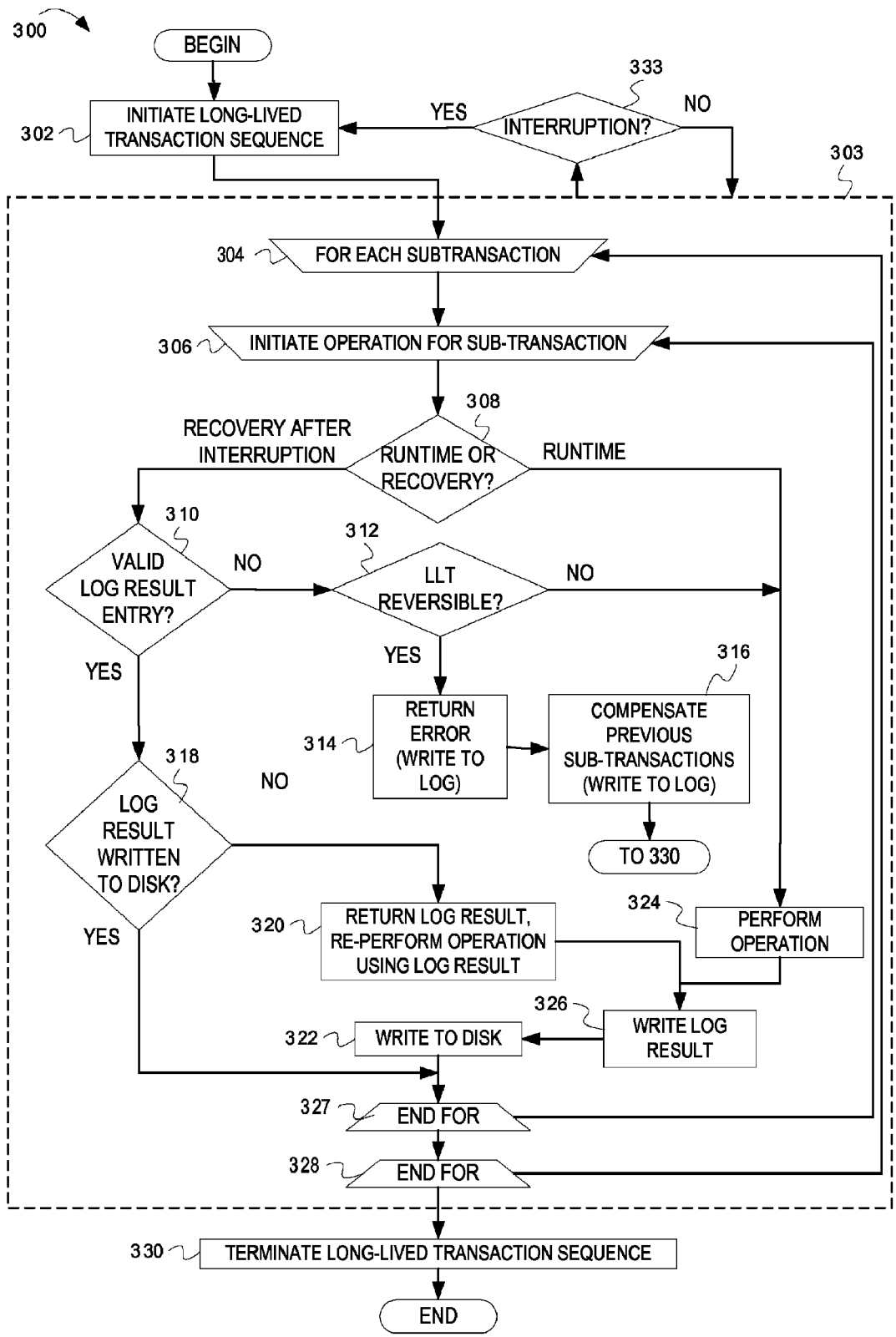
FIG. 3 is a flowchart depicting example operations for controlling and recovering long-lived transactions.

FIG. 3 is a flowchart depicting example operations for controlling and recovering long-lived transactions. For exemplary purposes, operations associated with the blocks in FIG. 3 will be described as being performed by a data management ("system"), which may, for example, include any or all of the elements described in FIG. 1 and/or FIG. 2, such as the long-lived transaction controller 102, the sub-transaction recovery module 124, the reversal eligibility module 125, the LLT 201, the sub-transactions 211-217, the operations, etc. FIG. 3 illustrates a flow 300 that the system can perform.

Referring to FIG. 3, the system initiates a long-lived transaction (LLT) sequence (302). FIGS. 1 and 2 illustrated one example of an LLT. The system can generate a unique identifier for the LLT and can pass the identifier to all sub-transaction operations to use to track and/or log the data for the particular transaction. The sequence of the sub-transactions can start with an initial sub-transaction that begins the sequence. The sequence can include a series of sub-transactions and/or or parallel sub-transactions.

The system further performs phase flow 303 as part of the flow 300. The phase flow 303 is the part of the flow 300 performed during each of the individual sub-transactions, or phases, of the flow 300. During the phase flow 303, for each of the sub-transactions (304), the system performs a loop (306) for each operation of the sub-transaction and determines whether the operation is performed the first time (i.e., at runtime) or as part of a recovery process (308). If performed during runtime, the system performs the operation (324) and writes a log entry of any results of the operation (326) and writes any data to disk (322) as needed. The flow can then return (327) in the loop to perform additional operations of the sub-transaction (306). The flow can also return (328) in a loop to and perform subsequent sub-transactions (304).

Performance of each sub-transaction in the phase flow 303 (i.e., each iteration of the loop 304) can be performed on separate nodes in the case of a distributed LLT, for instance, as described similarly in FIG. 1. Each sub-transaction, therefore, may write to different logs (e.g., one for each node) running the sub-transaction. In other embodiments, however, the system could utilize one centralized log instead of multiple logs on which all log entries for all sub-transactions are written. Such a configuration would include a synchronous write of the log record and an acknowledgement back from the LLT that the log record was written to the centralized log before the sub-transaction would write any data to disk. Thus, the system can ensure that entries are written to the log before any data is written to disk regardless of where the log is stored.

At some point during the phase flow 303, the flow 300 may encounter an interruption (333). If the flow 300 encounters an interruption, the system breaks out of the phase flow 303 and returns immediately to the beginning of the flow 300, for instance, reinitiating the long-lived transaction sequence (302). The flow 300 can then renter the phase flow 303 for a recovery pass. The flow 300, then, for each sub-transaction that occurred before the interruption (e.g., repeats for the first set of sub-transactions 211, 212 and 213 that occurred as described in FIG. 1), re-initiates the operation(s) (306) and determines that the system is performing a recovery after the interruption (308). The system repeats the re-performance of operation(s) within the phase flow 303 until encountering one operation that was interrupted. For that operations, during the recovery path, the system can determine several different things depending on a specific amount of work that was performed for the interrupted operation or that failed to get written to a log or disk for the operation. For example, the system can determine whether a valid log entry exists (310) for the operation. The system can determine whether a valid log entry exists by first determining if data exists for the operation. If no data exists in the log for the entry, then the system knows that there is no valid log entry. The system can also determine that data may exist, but it does not fit a required format for the data (e.g. is the wrong size, has the wrong syntax, lacks specific tags or validity indicators, etc.). If a valid log entry exists, then the system can determine whether data associated with the operation was written to disk (318). If the data was written to disk, the system can return (327) to the next operation for the sub-transaction and continue re-performance of the sequence of sub-transactions. If, however, data was not written to disk at 318 and needed to be written to disk, but was interrupted before being written to disk, the system accesses the log result and re-performs the operation (320) using the log result as needed. Whether the data is on disk can be tracked via the log record. Or, in other words, the system can track whether the data was written to disk by referring to the log entries. The system can further write a log entry (326) of the re-read of the log and the re-performance of the operation, as well as write data to disk (322) as needed for the operation. The system, thus, writes again to the log during the recovery path so that if another interruption occurs, and if the system needs to repeat the LLT flow again, the system can determine how far the previous recovery got in the previous, but interrupted, repetition of the LLT flow. In some embodiments, the system can write the data to the disk without performing the entire operation, but rather can perform only a portion of the operation because the log already contains data.

Returning to 310, the system may find that no log entry was written for the operation meaning that the interrupt occurred before the system could write the log entry for a particular operation. The system can then determine whether that the LLT is reversible (i.e., can determine if the LLT can even be reversed). If the LLT is reversible, the system returns an error (314) and compensates operation(s) for previously completed sub-transactions in a reverse order without having to perform a compensating transaction for the operation(s) of the sub-transaction that was interrupted (e.g., without having to compensate the fourth sub-transaction 214 from the second set of sub-transactions as described in FIG. 1). The system can write the return error to the log and can track the compensating transactions in the log. If another interruption occurs during the recovery, the system, and if the system has to repeat the flow 300 again, the system will be able to check whether errors have been previously returned or if compensating transactions had been previously performed using the log entries for the error and for compensating transactions. After performing the compensating transactions for the operations in reverse order, the system can then terminate If, at 312, the system determines that the LLT is not reversible, then the system attempts to re-perform the operation (324) and write to a log (326) and to disk (322) as needed until completing the LLT.

At 312, the system can mark the LLT as being irreversible, or as a "point of no return." The system can, for example, assign an indicator (flag) to the LLT (i.e., to the LLT ID) which specifies the LLT is irreversible. In some embodiments, the LLT ID can be a structure, not just an integer, so that the LLT ID can contain a flag as well as an integer identifier, and the structure can get passed into each subtransaction. In some embodiments, the system can instead utilize an integer for the LLT ID and can modify high-bits on the LLT ID integer to indicate the irreversibility flag specifying that the LLT is irreversible. When the system identifies the LLT as being irreversible, the system does not return an error, but pushes through the subsequent operation(s) of the LLT until completing the LLT as described previously. In some embodiments, before pushing through the subsequent operations of the LLT, system may require that all transactions that were not committed to disk (e.g., either before the LLT or within the LLT) be committed to disk. Also before pushing through the subsequent operations of the LLT, the system may also require waiting until all phases in the sequence that may be running in parallel are completed and have been committed to disk.

Further, at 314, when the system returned an error, the system can, at that point, mark the LLT as being an irreversible transaction because the clean up or reversal of the operations indicates a point of no return.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), through access to a common database or data store, and/or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
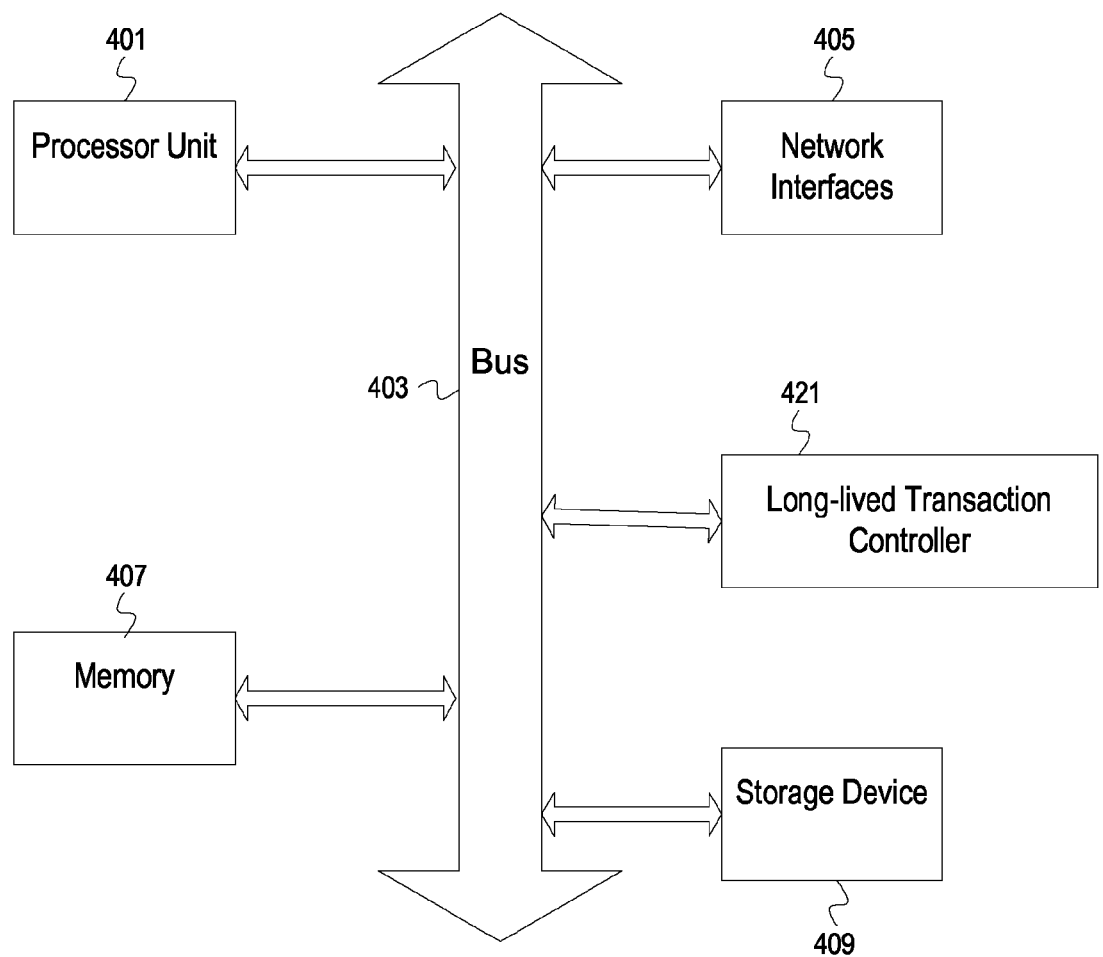
FIG. 4 depicts an example computer system.

FIG. 4 depicts an example computer system 400. The computer system 400 includes a processor unit 401 (possibly including multiple processors, multiple cores, multiple nodes, and/or implementing multi-threading, etc.). The computer system 400 includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable or computer readable media. The computer system 400 also includes a bus 403 (e.g., PCI bus, ISA, PCI-Express bus, HyperTransport® bus, InfiniBand® bus, NuBus bus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The computer system 400 also includes a long-lived transaction controller 421. The long-lived transaction controller 421 can control long-lived transactions and perform recovery operations. The long-lived transaction controller 421 can include individual components or parts that manage different aspects or parts of the long-lived transactions and data management. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for controlling long-lived transactions as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method comprising:
    initiating a long-lived transaction that comprises a plurality of operations that each generate data when performed, wherein the plurality of operations are required to be completed in a sequence for the long-lived transaction;
    generating an identifier for the long-lived transaction;
    writing the data to a log file for each completed one of the plurality of operations using the identifier;
    detecting an interruption in performance of an uncompleted one of the plurality of operations;
    restarting the long-lived transaction in response to detecting the interruption;
    reading the data written in the log file for each completed one of the plurality of operations in order of the sequence;
    determining, using the identifier, that the log file indicates a successful completion of each completed one of the plurality of operations in response to the reading the data written in the log file for each completed one of the plurality of operations in order of the sequence; and
    initiating re-performance of the uncompleted one of the plurality of operations in the order of the sequence without re-performing the each completed one of the plurality of operations in response to determining that the log file indicates the successful completion of the each completed one of the plurality of operations.

2. The method of claim 1 further comprising:
    determining that a log entry does not exist for the uncompleted one of the plurality of operations; and
    performing compensating transactions for each completed one of the plurality of operations and not for the uncompleted one of the plurality of operations in response to determining that the log entry does not exist for the uncompleted one of the plurality of operations.

3. The method of claim 1 further comprising:
    determining that a log entry exists for the uncompleted one of the plurality of operations;
    determining that the log entry is not properly formatted; and
    performing compensating transactions for each completed one of the plurality of operations and not for the uncompleted one of the plurality of operations.

4. The method of claim 1 further comprising:
    determining that a log entry exists for the uncompleted one of the plurality of operations;
    determining that the log entry is properly formatted;
    determining that additional data from the log entry was not written to a data store; and
    writing the additional data from the log entry to the data store.

5. The method of claim 1 further comprising:
    determining that a valid log entry does not exist for the uncompleted one of the plurality of operations;
    determining that the long-lived transaction is reversible; and
    performing compensating transactions for each completed one of the plurality of operations and not for the uncompleted one of the plurality of operations.

6. The method of claim 1 further comprising:
    determining that a valid log entry does not exist for the uncompleted one of the plurality of operations;
    determining that the long-lived transaction is irreversible; and
    repeating performance of the uncompleted one of the plurality of operations until successfully completing the uncompleted one of the plurality of operations.

7. The method of claim 6 further comprising:
    determining, after generating the identifier, that the long-lived transaction is irreversible;
    using the identifier of the long-lived transaction to track performance of the plurality of the operations;
    modifying the identifier of the long-lived transaction after determining that the long-lived transaction is irreversible; and using the identifier of the long-lived transaction, after said modifying, to track the repeating of the performance of the uncompleted one of the plurality of operations.

8. The method of claim 7, wherein said modifying the identifier of the long-lived transaction after determining that the long-lived transaction is irreversible includes either adding an indicator flag to a structure that represents the identifier or setting a high bit of an integer as an indicator flag that represents the identifier.

9. A computer program product for controlling a long-lived transaction, the computer program product comprising:
a computer readable storage medium having computer readable program code embodied therewith, the computer readable program code comprising:
computer readable program code configured to,
perform a first portion of a plurality of operations of the long-lived transaction, using an identifier associated with the long-lived transaction, wherein the long-lived transaction begins with one of the first portion of the plurality of the operations, wherein the plurality of the operations are required to be completed in a sequence for the long-lived transaction, and wherein each of the plurality of the operations generates data,
write individual log entries for the data to a log file, using the identifier, as each of the first portion of the plurality of the operations is performed in the sequence,
detect an interruption in the performance of an additional one of the plurality of operations that begins a second portion of the plurality of operations,
initiate re-performance of the first portion of the plurality of the operations in the sequence starting with the one of the plurality of the operations in response to detecting the interruption,
read the data written in each of the individual log entries in order of the sequence using the identifier,
determine, based on the data written in each of the individual log entries, that each of the individual log entries indicate a successful completion of each of the first portion of the plurality of the operations, and
skip performance of at least a part of each of the first portion of the plurality of operations in response to determining that each of the individual log entries indicate the successful completion of each of the first portion of the plurality of the operations.

10. The computer program product of claim 9, said computer readable program code being further configured to,
initiate re-performance of the additional one of the plurality of the operations that begins the second portion of the plurality of the operations,
determine that a log entry does not exist for the additional one of the plurality of the operations, and
perform compensating transactions for each of the first portion of the plurality of operations and not for the additional one of the plurality of the operations from the second portion of the plurality of the operations in response to determining that the log entry does not exist for the additional one of the plurality of the operations.

11. The computer program product of claim 9, said computer readable program code being further configured to,
initiate re-performance of the additional one of the plurality of the operations that begins the second portion of the plurality of the operations,
determine that a log entry exists for the additional one of the plurality of the operations,
determine that the log entry is not properly formatted, and
perform compensating transactions for each of the first portion of the plurality of operations and not for the additional one of the plurality of the operations from the second portion of the plurality of the operations.

12. The computer program product of claim 9, said computer readable program code being further configured to,
initiate re-performance of the additional one of the plurality of the operations that begins the second portion of the plurality of the operations,
determine that a log entry exists for the additional one of the plurality of the operations,
determine that the log entry is properly formatted,
determine that additional data from the log entry was not written to a data store, and
write the additional data from the log entry to the data store.

13. The computer program product of claim 9, said computer readable program code being further configured to,
initiate re-performance of the additional one of the plurality of the operations that begins the second portion of the plurality of the operations,
determine that a valid log entry does not exist for the additional one of the plurality of the operations,
determine that the long-lived transaction is reversible, and
perform compensating transactions for each of the first portion of the plurality of operations and not for the additional one of the plurality of the operations from the second portion of the plurality of the operations, wherein the compensating transactions are not generated during the performance of the first portion of the plurality of the operations before the interruption.

14. The computer program product of claim 9, said computer readable program code being further configured to,
initiate re-performance of the additional one of the plurality of the operations that begins the second portion of the plurality of the operations,
determine that a valid log entry does not exist for the additional one of the plurality of the operations,
determine that the long-lived transaction is irreversible, and
repeat performance of the additional one of the plurality of the operations until successfully completing the additional one of the plurality of the operations.

15. An apparatus comprising:
a processing unit;
a network interface; and
a long-lived transaction controller operable to, via the processing unit,
perform a first portion of a plurality of operations of the long-lived transaction using an identifier associated with the long-lived transaction, wherein the long-lived transaction begins with one of the first portion of the plurality of the operations, wherein the plurality of the operations are required to be completed in a sequence for the long-lived transaction, wherein each of the plurality of the operations generates data, and not generating a compensating transaction for any of the plurality of operations,
write individual log entries for the data to a log file, using the identifier, as each of the first portion of the plurality of the operations is performed in the sequence,
detect an interruption in the performance of an additional one of the plurality of operations that begins a second portion of the plurality of operations,
initiate re-performance of the first portion of the plurality of the operations in the sequence starting with the one of the plurality of the operations in response to detecting the interruption,
read the data written in each of the individual log entries in order of the sequence, determine, using the identifier, that each of the individual log entries indicate a successful completion of each of the first portion of the plurality of the operations, and skip performance of at least a part of each of the first portion of the plurality of operations in response to determining that each of the individual log entries indicate the successful completion of each of the first portion of the plurality of the operations.

16. The apparatus of claim 15, wherein the long-lived transaction controller is further operable to use at least a portion of the data in at least one of the individual log entries to perform at least an additional part of at least one of the first portion of the plurality of operations.

17. The apparatus of claim 15, wherein the long-lived transaction controller is further operable to initiate re-performance of the additional one of the plurality of the operations that begins the second portion of the plurality of the operations, determine that a log entry does not exist for the additional one of the plurality of the operations, and return an indication of an error.

18. The apparatus of claim 17, wherein the long-lived transaction controller is further operable to determine that the long-lived transaction is eligible to be reversed, and perform a compensating transaction for each of the first portion of the plurality of the operations in reverse order of the sequence.

19. The apparatus of claim 15, wherein the long-lived transaction controller is further operable to mark the long-lived transaction as being ineligible to reverse the plurality of the operations using compensating transactions, and re-perform the second portion of the plurality of the operations until the long-lived transaction completes the sequence.

20. A computer program product for controlling a long-lived transaction, the computer program product comprising:

a computer readable storage medium having computer readable program code embodied therewith, the computer readable program code comprising:

computer readable program code configured to, perform a first of a plurality of sub-transactions from the long-lived transaction using an identifier associated with the long-lived transaction, wherein the plurality of the sub-transactions are required to be completed in a sequence for the long-lived transaction, determine, in response to performance of the first of the plurality of sub-transactions, that the first of the plurality of the sub-transactions requires a write of a data value to a database, write in a log, using the identifier, an entry that indicates the data value in response to performance of the first of the plurality of sub-transactions, detect an interruption in performance of the write of the data value to the database, initiate re-performance of the first of the plurality of the sub-transactions in order of the sequence in response to detection of the interruption in the performance of the write of the data value to the database, during re-performance of the first of the plurality of the sub-transactions in order of the sequence, detect the data value in the entry of the log using the identifier, and use the data value indicated in the entry of the log to write the data value to the database in response to detection of the data value in the entry of the log during re-performance of the first of the plurality of the sub-transactions in order of the sequence.

21. The computer program product of claim 20, said computer readable program code being further configured to, initiate the long-lived transaction before performing the first of the plurality of the operations, generate the identifier for the long-lived transaction, initiate the first of a plurality of operations for the long-lived transaction, and associate the identifier for the long-lived transaction with the first of the plurality of the operations.

22. The computer program product of claim 21, said computer readable program code being further configured to, determine, after performance of the first of the plurality of the sub-transactions, that the long-lived transaction is ineligible to be recovered, modify a characteristic of the identifier to indicate that the long-lived transaction is ineligible to be recovered, and repeat the re-performance of the first of the plurality of the sub-transactions in response to the identifier indicating that the long-lived transaction is ineligible to be recovered.

23. The computer program product of claim 22, said computer readable program code being further configured to modify the characteristic of the identifier of the long-lived transaction being further configured to either add an indicator flag to a structure that represents the identifier or set a high bit of an integer as an indicator flag that represents the identifier.

24. The computer program product of claim 20, said computer readable program code being further configured to, initiate re-performance of the plurality of the sub-transactions from a beginning sub-transaction of the sequence in response to detecting the interruption.

* * * * *